(12) United States Patent
Kariya et al.

(10) Patent No.: US 10,486,351 B2
(45) Date of Patent: Nov. 26, 2019

(54) SCREW, INJECTION MOLDING MACHINE, AND INJECTION MOLDING METHOD

(71) Applicants: U-MHI PLATECH CO., LTD., Aichi (JP); MITSUBISHI HEAVY INDUSTRIES, LTD., Tokyo (JP)

(72) Inventors: Toshihiko Kariya, Aichi (JP); Munehiro Nobuta, Aichi (JP); Naoki Toda, Aichi (JP); Kiyoshi Kinoshita, Aichi (JP); Takeshi Yamaguchi, Aichi (JP)

(73) Assignees: U-MHI PLATECH CO., LTD., Aichi (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 316 days.

(21) Appl. No.: 15/115,253

(22) PCT Filed: Jun. 9, 2014

(86) PCT No.: PCT/JP2014/003066
§ 371 (c)(1),
(2) Date: Jul. 28, 2016

(87) PCT Pub. No.: WO2015/189869
PCT Pub. Date: Dec. 17, 2015

(65) Prior Publication Data
US 2017/0001353 A1 Jan. 5, 2017

(51) Int. Cl.
*B29C 45/50* (2006.01)
*B29C 45/60* (2006.01)
(Continued)

(52) U.S. Cl.
CPC .......... *B29C 45/47* (2013.01); *B29C 45/0005* (2013.01); *B29C 45/50* (2013.01);
(Continued)

(58) Field of Classification Search
CPC . B29C 45/0005; B29C 45/47; B29C 45/5004; B29C 45/60; B29C 45/50; B29K 2105/12
See application file for complete search history.

(56) References Cited

U.S. PATENT DOCUMENTS

| | | | |
|---|---|---|---|
| 2013/0099421 A1* | 4/2013 | Kariya | B29C 45/0005 264/328.18 |
| 2014/0065257 A1* | 3/2014 | Izawa | B29C 45/1816 425/551 |

(Continued)

FOREIGN PATENT DOCUMENTS

| | | |
|---|---|---|
| DE | 4236662 A1 | 5/1993 |
| JP | 7-205233 A | 8/1995 |

(Continued)

OTHER PUBLICATIONS

Extended European Search Report in EP Application No. 14894300.4, dated Mar. 28, 2017.
(Continued)

*Primary Examiner* — Joseph S Del Sole
*Assistant Examiner* — Joseph S Leyson
(74) *Attorney, Agent, or Firm* — Kanesaka Berner and Partners LLPP

(57) ABSTRACT

There is provided a screw of an injection molding machine that can eliminate uneven distribution of reinforcing fibers without giving an excessive shear force to the reinforcing fibers. A screw is provided inside a heating cylinder of an injection molding machine to which a resin pellet is fed on an upstream side in a conveyance direction of resin and to which reinforcing fibers are fed on a downstream side therein, and includes: a first stage at which the resin pellet which is fed is melted; and a second stage that continues to the first stage, and at which molten resin and the reinforcing fibers are mixed with each other. A second flight provided at the second stage includes: a large-diameter flight with a (Continued)

relatively large outer diameter; and a small-diameter flight with a relatively small outer diameter.

6 Claims, 8 Drawing Sheets

(51) Int. Cl.
*B29C 45/47* (2006.01)
*B29C 45/00* (2006.01)
B29K 105/00 (2006.01)
B29K 105/12 (2006.01)

(52) U.S. Cl.
CPC ...... *B29C 45/60* (2013.01); *B29K 2105/0067* (2013.01); *B29K 2105/12* (2013.01)

(56) References Cited

U.S. PATENT DOCUMENTS

2017/0355119 A1* 12/2017 Nobuta ............... B29C 45/50
2018/0022003 A1* 1/2018 Nobuta ............... B29C 45/50
264/328.18

FOREIGN PATENT DOCUMENTS

| JP | 2003-103587 A | 4/2003 |
|---|---|---|
| JP | 2005-14272 A | 1/2005 |
| JP | 2009-96072 A | 5/2009 |
| JP | 2011-31514 A | 2/2011 |
| JP | 2012-56173 A | 3/2012 |
| JP | 2012-511445 A | 5/2012 |
| JP | 2014-4744 A | 1/2014 |
| JP | 2014-46631 A | 3/2014 |
| WO | 2012/056505 A1 | 5/2012 |

OTHER PUBLICATIONS

International Search Report in PCT/JP2014/003066, dated Jul. 15, 2014.

Office Action in JP Application No. 2015-536698, dated Nov. 18, 2015.

* cited by examiner

FIG. 4A
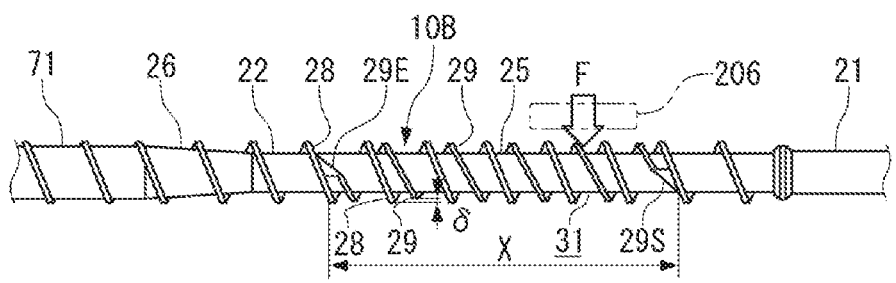
FIG. 4B
FIG. 4C
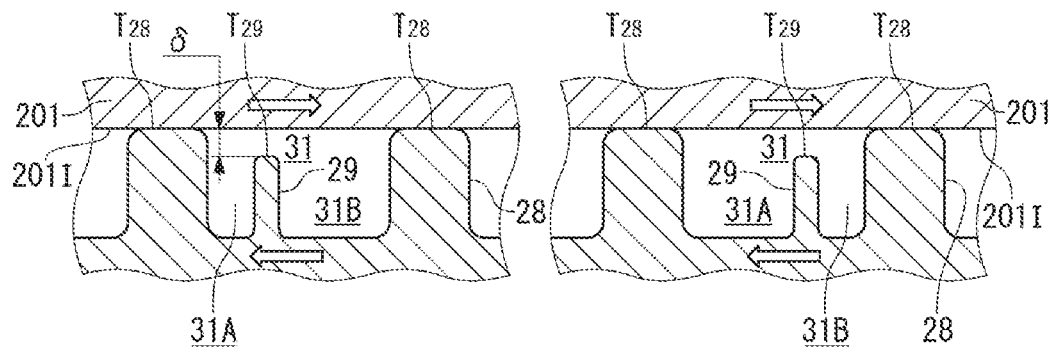
FIG. 4D
FIG. 4E
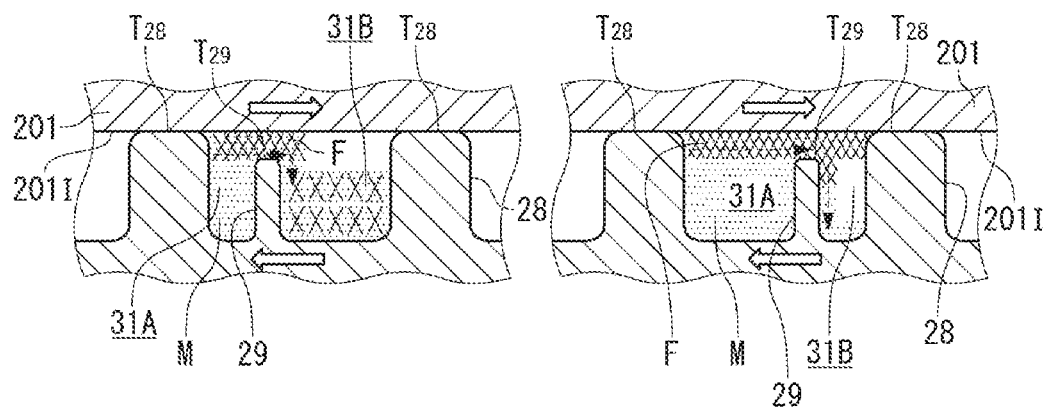

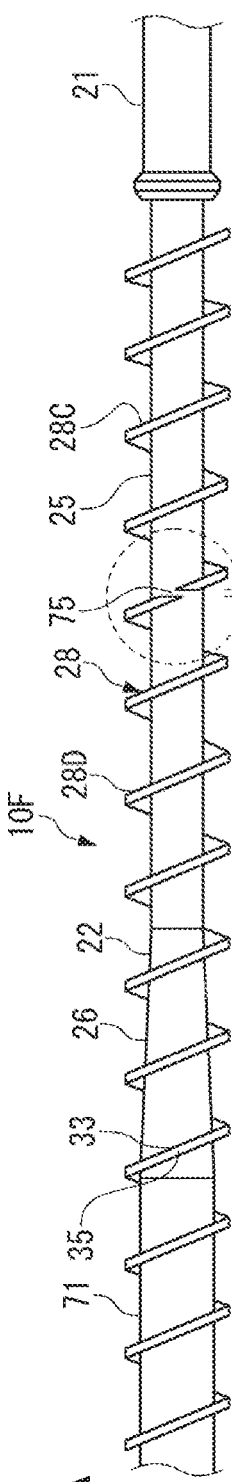
FIG. 7A
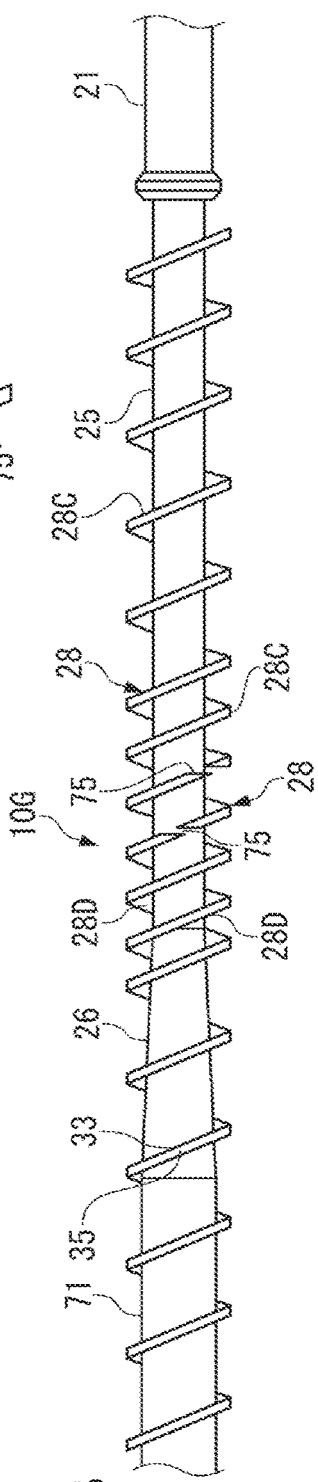
FIG. 7B
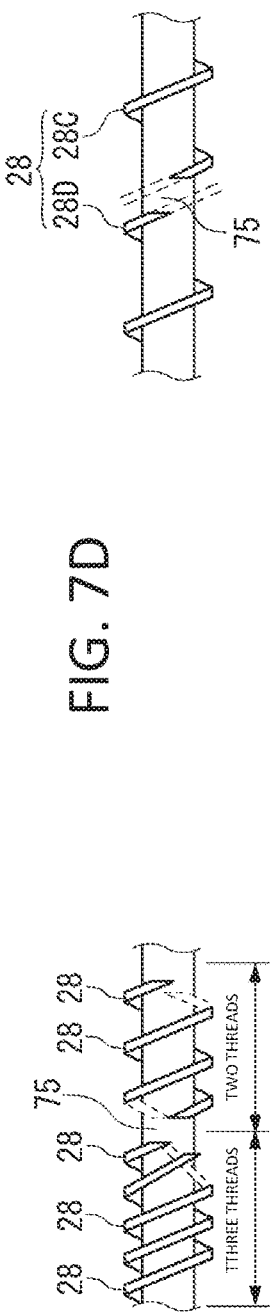
FIG. 7C
FIG. 7D

SCREW, INJECTION MOLDING MACHINE, AND INJECTION MOLDING METHOD

RELATED APPLICATIONS

The present application is a National Phase entry of International Application No. PCT/JP2014/003066, filed Jun. 9, 2014.

TECHNICAL FIELD

The present invention relates to injection molding of resin containing reinforcing fibers.

BACKGROUND ART

There have been used for various applications molded products of fiber reinforced resin in which strength have been enhanced by making them contain reinforcing fibers. As a technique to obtain the molded product by injection molding, a technique has been known in which thermoplastic resin is melted by rotation of a screw in a cylinder serving as a plasticizing device, fibers are mixed in or kneaded with the melted thermoplastic resin, and subsequently, the thermoplastic resin is injected into a mold of an injection molding machine.

In order to obtain an effect of improved strength by reinforcing fibers, the reinforcing fibers are desired to be uniformly dispersed in resin. Although mixing conditions may just be made severe to strengthen a shear force given to reinforcing fibers in order to achieve uniform dispersion, an excessively strong shear force causes cutting of the reinforcing fibers. In that case, a fiber length after molding might be significantly shorter than an original fiber length, and obtained molded products cannot possibly satisfy desired characteristics (Patent Literature 1). Accordingly, it becomes necessary to select conditions of injection molding in which the shear force is weakened so that breakage of the fibers does not occur at the time of mixing. In that case, the reinforcing fibers cannot be uniformly dispersed in fiber reinforced resin, and are unevenly distributed. Although a mechanism (a feeder) that forcibly feeds the reinforcing fibers inside the cylinder is also provided in order to contribute to uniform dispersion of the reinforcing fibers (for example, Patent Literature 2), a mass of the reinforcing fibers has not been eliminated yet. Particularly, in a case where a contained amount of the reinforcing fibers is high, i.e. not less than 10%, it is difficult to uniformly disperse the reinforcing fibers in the resin.

CITATION LIST

Patent Literature

Patent Literature 1: Japanese Patent Laid-Open No. 2012-56173
Patent Literature 2: Japanese Patent Laid-Open No. 2012-511445

SUMMARY OF INVENTION

Technical Problem

The present invention aims to provide a screw of an injection molding machine that can eliminate uneven distribution of reinforcing fibers without giving an excessive shear force to the reinforcing fibers.

In addition, the present invention aims to provide an injection molding machine including such an injection screw.

Further, the present invention aims to provide a method of injection-molding resin containing reinforcing fibers using such an injection screw.

Solution to Problem

The present inventors examined a cause of uneven distribution of reinforcing fibers, and obtained one conclusion. That is, during a plasticizing process of injection molding, as shown in FIGS. 8A to 8C, a fiber mass, which is a set of a number of reinforcing fibers F, and molten resin M are present in a screw groove 301 between flights 306 of a screw 300 for injection molding arranged inside a cylinder 310, the fiber mass and the molten resin M being separated into a pull side 303 and a push side 305 of the flight. Since a viscosity of the molten resin M is relatively high, and the molten resin M cannot get into the fiber mass, a shear force by rotation of the screw 300 through a medium of the molten resin M is not transmitted to an inside of the fiber mass, and opening of the fiber mass does not proceed. Accordingly, since the reinforcing fibers F are injection-molded while remaining as the fiber mass, they are unevenly distributed in a molded product. Note that a white arrow of FIG. 8A shows a direction in which the screw 300 rotates, and that white arrows of FIG. 8C show relative moving directions of the screw 300 and the cylinder 310 in an axial direction or in a peripheral direction along with the rotation of the screw 300. The same applies to an embodiment, which will be mentioned later.

Consequently, the present inventors have conceived of an idea in which a part of the molten resin M present on the push side 305 of the flight of the screw groove 301 is made to flow backward to the adjacent pull side 303 of the screw groove 301 over a top portion T of the flight 306. That is, it is the idea that opening of a fiber mass is promoted by making the molten resin M having flowed backward act on the fiber mass.

The screw of the present invention based on the above knowledge is provided inside a cylinder of an injection molding machine to which a resin raw material is fed on an upstream side and to which reinforcing fibers are fed on a downstream side, and includes: a first stage at which the resin raw material which is fed is melted; and a second stage that continues to the first stage, and at which the melted resin raw material and the reinforcing fibers which are fed are mixed with each other.

In the screw of the present invention, a flight provided at the second stage includes a resin passage in which a backflow of the melted resin raw material is generated from a screw groove of the downstream side toward a screw groove of the upstream side of the screw. The screw of the present invention is intended so that the backflow is generated in the molten resin M by providing the resin passage.

Note that a term of the upstream or the downstream used in the present application shall be used on the basis of a direction in which the resin is conveyed by the screw.

A mode of the resin passage in the screw of the present invention can be selected from a mode A in which the resin passage is continuously provided in a predetermined range in a winding direction of the flight, and a mode B in which the resin passage is provided at a part of the flight in the winding direction.

In the mode A, both of a first mode in which the second stage includes a single-thread flight and a second mode in which the second stage includes a two-thread flight can be selected.

In the first mode in the mode A, in the second stage, a large-diameter flight, and a small-diameter flight with a relatively small outer diameter are continuous with each other to thereby form the single-thread flight. A backflow passage in the mode is formed with a gap between a top portion of the small-diameter flight and the cylinder.

In addition, in the second mode, the second stage is formed with the two-thread flight including a main flight, and a sub-flight provided in a screw groove formed by the main flight, the main flight serves as the large-diameter flight, and the sub-flight serves as the small-diameter flight. Also in the mode, a backflow passage is formed with a gap between a top portion of the small-diameter flight and the cylinder.

In the second mode, the sub-flight can be provided at a part or a plurality of points of the screw in an axial direction.

In addition, in the second mode, the sub-flight can be provided corresponding to a portion to which the reinforcing fibers are fed. As a matter of course, it can also be provided at a position away from the portion to which the reinforcing fibers are fed.

In addition, in the second mode, either one or both of a start end and a terminal end of the sub-flight is (are) preferably blocked to the main flight.

In addition, the mode B includes an intermittent flight in which a notch has been provided at a part of the flight so that continuity is lacked in the winding direction of the flight, and the resin passage can be achieved by a third mode including the notch.

The present invention provides an injection molding machine of fiber reinforced resin, the injection molding machine including: a cylinder at which a discharge nozzle has been formed; a screw provided rotatable and movable in a rotation axis direction inside the cylinder; a resin feed portion that feeds a resin raw material in the cylinder; and a fiber feed portion that is provided closer to a downstream side than the resin feed portion, and feeds reinforcing fibers in the cylinder, in which the above-mentioned screw is applied.

In addition, the present invention provides an injection molding method of fiber reinforced resin, the injection molding method being for feeding a resin raw material to a cylinder inside which a screw rotatable and movable in a rotation axis direction has been provided, also feeding reinforcing fibers closer to a downstream side than the resin raw material, and injection-molding the reinforcing fibers, in which the above-mentioned screw is applied.

Advantageous Effects of Invention

According to the present invention, there can be provided the screw of the injection molding machine that can eliminate uneven distribution of the reinforcing fibers without giving an excessive shear force to the reinforcing fibers.

BRIEF DESCRIPTION OF DRAWINGS

FIG. 2A shows the molten state at the time of plasticization start; FIG. 2B at the time of plasticization completion.

FIGS. 3A to 3F are views showing a screw (a first embodiment) according to the embodiment: FIG. 3A is a side view showing a main portion of a second stage; FIG. 3B is a cross-sectional view showing a screw groove formed by a large-diameter flight, and a vicinity thereof; FIG. 3C is a cross-sectional view showing a screw groove formed by a small-diameter flight, and a vicinity thereof; FIG. 3D is a cross-sectional view showing that molten resin M flows backward over a top portion of the small-diameter flight; FIG. 3E is a view showing the molten resin M that acts on a mass of reinforcing fibers F; and FIG. 3F is a view showing a shear force that acts on the mass of the reinforcing fibers F.

FIGS. 4A to 4E show the other screw (a second-first mode) according to the embodiment: FIG. 4A is a side view showing a main portion of a second stage; FIGS. 4B and 4C are cross-sectional views of a portion in which a sub-flight (a small-diameter flight) is provided, FIG. 4B shows a downstream side, and FIG. 4C an upstream side; and FIGS. 4D and 4E are cross-sectional views showing that the molten resin M flows backward over a top portion of a barrier flight in FIGS. 4B and 4C, respectively.

FIG. 5A is a side view showing a main portion of a second stage; FIG. 5B is a cross-sectional view of a portion in which a sub-flight (a small-diameter flight) is provided; FIG. 5C is a cross-sectional view of a portion in which the sub-flight is not provided; and FIGS. 5D and 5E are cross-sectional views showing behavior of the molten resin M and the reinforcing fibers F in FIGS. 5B and 5C, respectively.

FIGS. 7A to 7D show a still other screw (a third mode) according to the embodiment: FIG. 7A is a side view showing a main portion of a second stage; FIG. 7B is a cross-sectional view of a portion in which a sub-flight (a small-diameter flight) is provided; FIG. 7C is a cross-sectional view of a portion in which the sub-flight is not provided; and FIG. 7D is a cross-sectional views showing behavior of the molten resin M and the reinforcing fibers F in FIGS. 7B and 7C, respectively.

FIG. 8A is a side view showing a portion of a second stage; FIG. 8B is a cross-sectional view showing a screw groove formed by flights, and a vicinity of the screw groove; and FIG. 8C is a cross-sectional view schematically showing that a mass of reinforcing fibers and a mass of molten resin are separately present inside the screw groove.

DESCRIPTION OF EMBODIMENT

Hereinafter, the present invention will be explained in detail based on an embodiment shown in accompanying drawings.

[First Embodiment]

Figure 1:
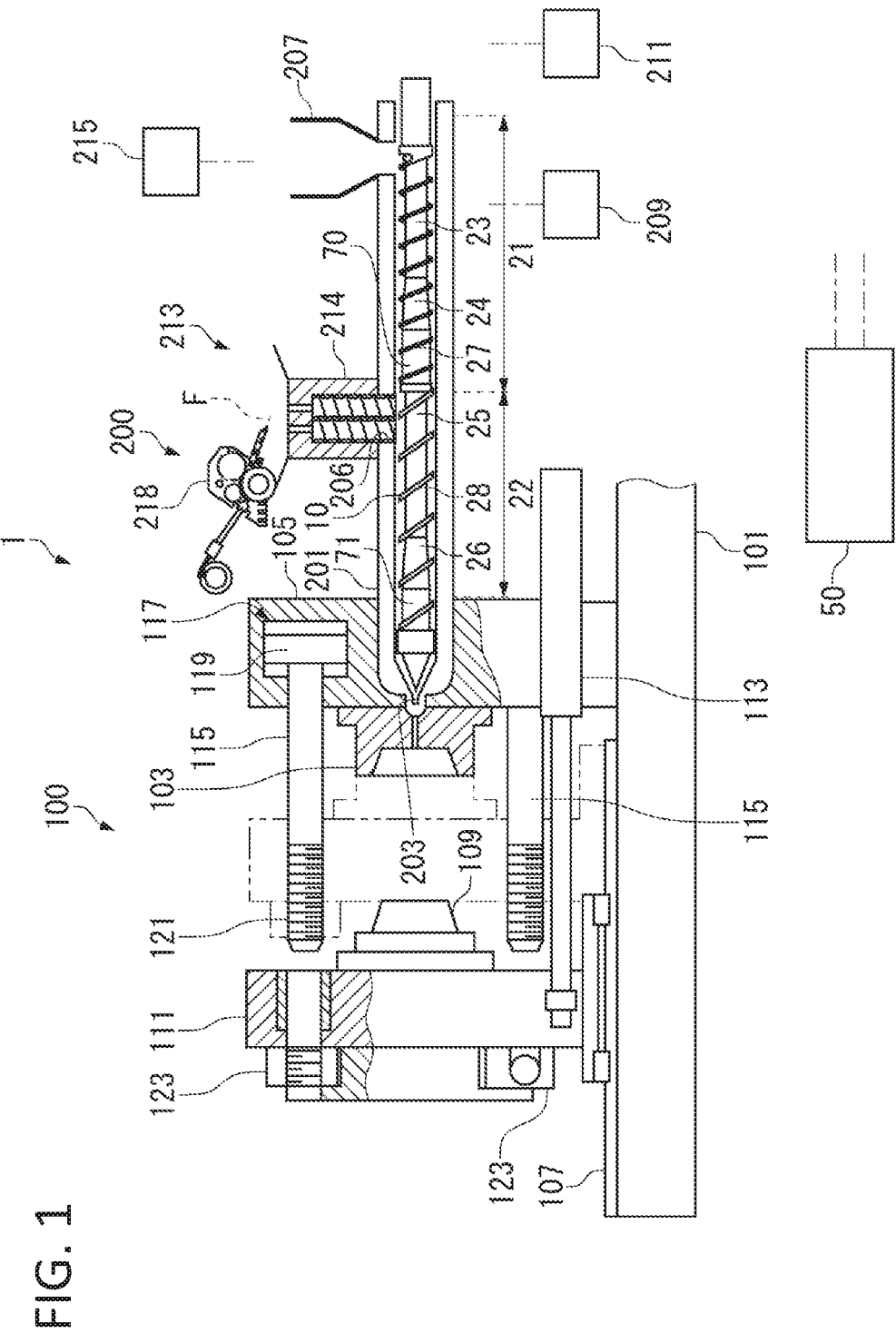
FIG. 1 is a view showing a schematic configuration of an injection molding machine according to the embodiment.

An injection molding machine 1 according to the embodiment, as shown in FIG. 1, includes: a mold clamping unit 100; a plasticizing unit 200; and a control unit 50 that controls operations of the units.

Hereinafter, outlines of a configuration and an operation of the mold clamping unit 100, and a configuration and an operation of the plasticizing unit 200 will be explained, and next, procedures of injection molding by the injection molding machine 1 will be explained.

[Configuration of Mold Clamping Unit]

The mold clamping unit 100 includes: a fixed die plate 105 that has been fixed on a base frame 101 and to which a fixed mold 103 has been attached; a movable die plate 111 that moves on a slide member 107, such as a rail and a slide plate in a left and right direction in FIG. 1 by actuating a hydraulic cylinder 113, and to which a movable mold 109 has been attached; and a plurality of tie bars 115 that couple the fixed die plate 105 with the movable die plate 111. At the fixed die plate 105, a hydraulic cylinder 117 for mold clamping is provided coaxially with each tie bar 115, and one end of the each tie bar 115 is connected to a ram 119 of the hydraulic cylinder 117.

Each of the components performs a necessary operation in accordance with an instruction of the control unit 50.

[Operation of Mold Clamping Unit]

An operation of the mold clamping unit 100 is outlined as follows.

First, the movable die plate 111 is moved to a position of a chain double-dashed line in FIG. 1 by actuation of the hydraulic cylinder 113 for mold opening and closing to thereby make the movable mold 109 abut against the fixed mold 103. Next, a male screw portion 121 of each tie bar 115 and a half nut 123 provided at the movable die plate 111 are engaged with each other to thereby fix the movable die plate 111 to the tie bars 115. Subsequently, a pressure of hydraulic oil of an oil chamber of a movable die plate 111 side in the hydraulic cylinder 117 is increased to thereby clamp the fixed mold 103 and the movable mold 109. After mold clamping is performed in a manner as described above, molten resin M is injected from the plasticizing unit 200 into a cavity of the mold to then form a molded product.

Since the screw 10 of the embodiment, as will be mentioned later, has a system that individually feeds a thermoplastic resin pellet P and reinforcing fibers F in a longitudinal direction of the screw, an entire length of the screw 10 or an entire length of the plasticizing unit 200 tends to be long. For this reason, in the embodiment, combining the mold clamping unit 100 having the above-mentioned configuration that can save a space is effective for suppressing an entire length of the injection molding machine 1 to be short, the mold clamping unit 100 being able to be installed even in a narrow space in which a mold clamping apparatus of a toggle link system or a system including a mold clamping cylinder at a back surface of a movable die plate cannot be installed. However, the configuration of the mold clamping unit 100 shown here is merely one example, and it does not prevent application of or replacement with the other configuration. For example, although the hydraulic cylinder 113 is shown as an actuator for mold opening and closing in the embodiment, it may be replaced with a combination of a mechanism that converts a rotational motion into a linear motion, and an electric motor, such as a servomotor and an induction motor. As the conversion mechanism, a ball screw and a rack and pinion can be used. In addition, it is needless to say that the mold clamping unit 100 may be replaced with a toggle link type mold clamping unit by electric drive or hydraulic drive.

[Configuration of Plasticizing Unit]

The plasticizing unit 200 includes: a cylindrical heating cylinder 201; a discharge nozzle 203 provided at a downstream end of the heating cylinder 201; the screw 10 provided inside the heating cylinder 201; a fiber feed device 213 to which the reinforcing fibers F are fed; and a resin feed hopper 207 to which the resin pellet P is fed. The fiber feed device 213 is coupled with a vent hole 206 provided closer to the downstream side than the resin feed hopper 207.

The plasticizing unit 200 includes: a first electric motor 209 that advances or retreats the screw 10; a second electric motor 211 that rotates the screw 10 in a normal or a reverse direction; and a pellet feed device 215 that feeds the resin pellet P to the resin feed hopper 207. Each of the components performs a necessary operation in accordance with an instruction of the control unit 50.

The screw 10 has a two-stage type design similar to a so-called gas vent type screw. Specifically, the screw 10 has a first stage 21 provided on an upstream side, and a second stage 22 that continues to the first stage 21 and is provided on the downstream side, the first stage 21 includes a feed portion 23, a compression portion 24, and a measurement portion 70 in that order from the upstream side, and the second stage 22 includes a feed portion 25, a compression portion 26, and a measurement portion 71 in that order from the upstream side. Note that a right side in FIG. 1 is the upstream side, and that a left side therein is the downstream side. The same applies to an embodiment, which will be mentioned later.

In the screw 10, a first flight 27 is provided at the first stage 21, and a second flight 28 is provided at the second stage 22.

Figure 8A:
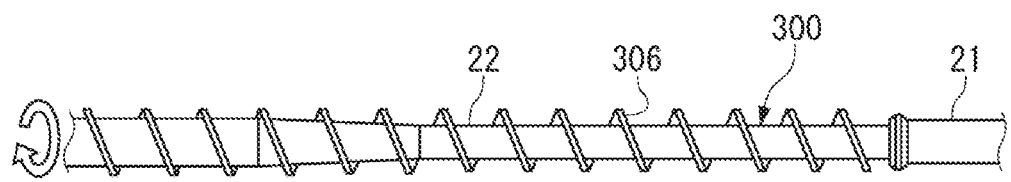
FIGS. 8A to 8C show a conventional screw.
Figure 8B:
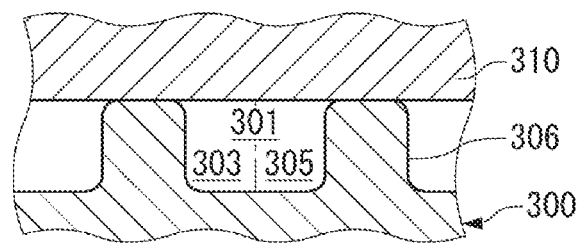

In both of the first stage 21 and the second stage 22, relatively, screw grooves between the flights in the feed portions 23 and 25 are set to be deep, screw grooves between the flights of the compression portions 24 and 26 are set to gradually decrease from the upstream side toward the downstream side, and screw grooves in the measurement portions 70 and 71 are set to be the most shallow. Here, since the screw groove of the feed portion 25 of the second stage 22 is deeper than that of the measurement portion 70 of the first stage 21, the molten resin M discharged from the first stage 21 to the feed portion 25 cannot fill the screw groove of the feed portion 25. Hereby, the molten resin M is pushed against the push side 305 by rotation of the screw 10, and is unevenly distributed. Hereby, a space is generated on the pull side 303 of the feed portion 25 of the second stage 22. For this reason, it is understood that the reinforcing fibers F fed from the fiber feed device 213 through the vent hole 206 are distributed to the pull side 303 serving as the space, and that thereby the molten resin M and the reinforcing fibers F are divided as shown in FIG. 8.

Since the first stage 21 conveys the generated molten resin M toward the second stage 22 in addition to melting a resin raw material to thereby generate the molten resin M, it may just include a function to secure a conveyance velocity and plasticizing capacity of the molten resin M.

In order to obtain the function, as shown in FIG. 1, it is preferable that a flight lead (L1) of the first flight 27 of the first stage 21 is not more than a flight lead (L2) of the second flight 28 of the second stage 22, i.e. L1≤L2 is established. Note that the flight lead (hereinafter simply referred to as a lead) means an interval between flights at the front and rear. As one index, the lead L1 of the first flight 27 is preferably set to be 0.4 to 1.0 times of the lead L2, and is more preferably set to be 0.5 to 0.9 times thereof.

Figure 3A:
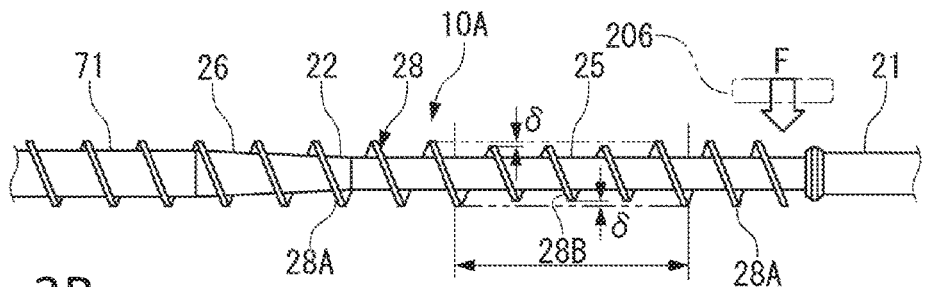

Next, in the second stage 22, the second flight 28 includes a large-diameter flight 28A with a large outer diameter, and a small-diameter flight 28B with a small outer diameter as shown in FIG. 3A. A size of an outer diameter here is a relative matter, and the outer diameter (a radius) of the small-diameter flight 28B is set to be smaller than that of the large-diameter flight 28A by δ.

Figure 3B:
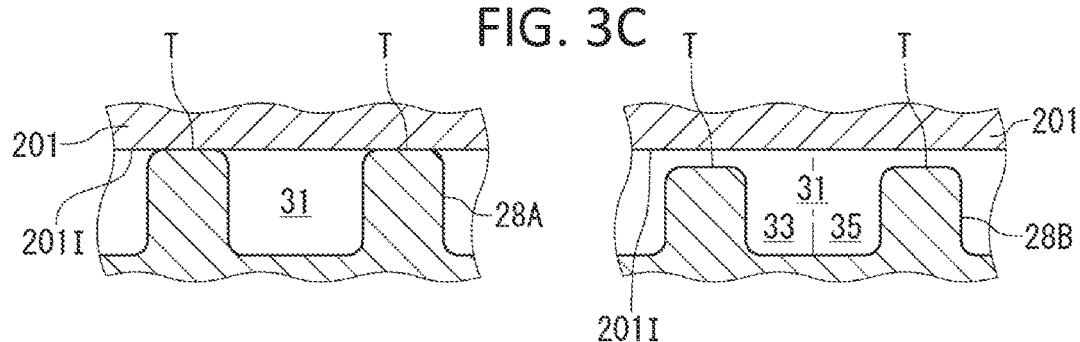
Figure 3C:
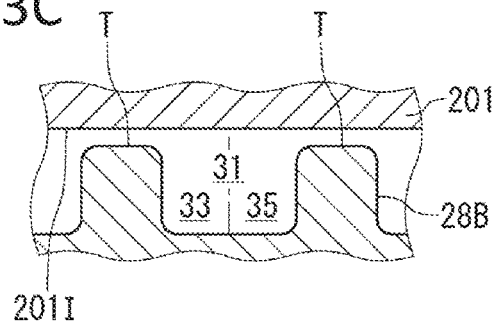
FIG. 3C at the time of injection completion.

An outer diameter of a flight of a screw is usually set so that a top portion thereof can slide to an inner surface of a heating cylinder. As shown in FIGS. 3B and 3C, the large-diameter flight 28A of the embodiment corresponds to the flight slidable to the inner surface of the heating cylinder, and the small-diameter flight 28B is formed so that a top portion T thereof is separated from an inner surface of the heating cylinder 201. A gap generated between the top portion T and the inner surface forms a resin passage in the present invention in which a backflow of the molten resin M is generated.

In the screw 10, the large-diameter flight 28A, the small-diameter flight 28B, and the large-diameter flight 28A are arranged in that order from the upstream side on which the reinforcing fibers F are put in.

Effects by providing the small-diameter flight 28B at the second stage 22 will be mentioned after procedures of injection molding are explained.

According to the above-mentioned preferred mode in which L1≤L2 is established, the lead L2 of the second flight 28 of the second stage 22 is larger than the lead L1 of the first flight 27. The reinforcing fibers F are fed to a rear end side of the second stage 22 during the plasticizing process. When the lead L2 is large, a groove width between the second flights 28 is large, thereby making a large space, the space in which the reinforcing fibers F drop and fill. In addition to that, the number of times decreases that the vent hole 206 is blocked by the second flight 28 at the time of retreat of the screw 10 in the plasticizing process, and at the time of advance of the screw 10 in an injection process. Accordingly, even during the retreat or the advance of the screw 10, the drop of the reinforcing fibers F is not stopped at the second flight 28, and the reinforcing fibers F easily continuously drop in the groove. Specifically, in a region of the second flight 28 in which the reinforcing fibers F fed through the vent hole 206 are received, the lead L2 is preferably set to be not less than 1.0×D, and is more preferably set to be not less than 1.2×D. Thereby, the reinforcing fibers F can be stably dropped in the groove of the screw 10 during the injection process. Note that D is an inner diameter of the heating cylinder 201.

However, when the lead L2 becomes too large, a force of conveying the molten resin M becomes weak, conveyance of the molten resin M becomes unstable even at an extent of a back pressure (5 to 10 MPa) required for usual plasticization, the molten resin M due to the back pressure flows backward to the vent hole 206, and vent-up easily occurs. Accordingly, the lead L2 is preferably set to be not more than 2.0×D, and is more preferably set to be not more than 1.7×D. That is, the lead L2 of the second flight 28 is preferably set to be 1.0×D to 2.0×D, and is more preferably set to be 1.2×D to 1.7×D.

In addition, a width of the flight of the second flight 28 is preferably set to be 0.01 to 0.3 times (0.01×L2 to 0.3×L2) of the lead L2. This is because when the width of the flight is smaller than 0.01 times of the lead L2, strength of the second flight 28 becomes insufficient, and because when the width of the flight exceeds 0.3 times of the lead L2, a screw groove width becomes small, and the fibers are caught in a flight top to thereby be hard to drop in the groove.

In addition, besides the above-mentioned preferred mode in which L1≤L2 is established, a part or all of the second flights 28 particularly of the feed portion 25 of the second stage 22 may be a plural-thread flight (plural-thread flights) instead of a single-thread flight (single-thread flights). In this case, since the molten resin M discharged from the first stage 21 is divided and distributed into the screw grooves partitioned by the plural-thread flights, respectively, and thus a fiber mass and the molten resin M are brought into contact with and are mixed with each other in each screw groove, respectively, the plural-threaded flights are effective for impregnation of the molten resin M into the fiber mass. Further, since the number of times of passes of the flights under the vent hole 206 per one rotation of the screw 10 is increased by the plural-threaded flights by employing the plural-threaded flights for the region to which the reinforcing fibers F are fed from the fiber feed device 213, capability to scrape the reinforcing fibers F from the vent hole 206 is improved, and efficiency of taking the reinforcing fibers F in the screw 10 groove is improved.

In the fiber feed device 213 of the embodiment, a biaxial type screw feeder 214 is provided at the heating cylinder 201 as shown in FIG. 1, and the reinforcing fibers F are forcibly fed in the groove of the screw 10. Note that it is needless to say that there is no problem if a uniaxial type screw feeder is used.

As a method of feeding the reinforcing fibers F to the biaxial type screw feeder 214, continuous fibers, so-called fibers in a roving state (hereinafter referred to as roving fibers) may be directly put in the biaxial type screw feeder 214, or fibers in a chopped strand state (hereinafter referred to as chopped fibers) may be put therein, the fibers being previously cut to have a predetermined length. Alternatively, the roving fibers and the chopped fibers may be mixed and put in the biaxial type screw feeder 214 at a predetermined ratio.

In a case where the chopped fibers are put in the biaxial type screw feeder 214, the roving fibers may be conveyed near a fiber inlet of a measurement feeder as they are, and may be put in the above-described measurement feeder immediately after being cut near the fiber inlet. Hereby, since the chopped fibers likely to be scattered are not exposed before being put in the molding machine, workability can be improved.

In the embodiment, a roving cutter 218 is provided near the fiber inlet of the biaxial type screw feeder 214. The roving fibers are cut by the roving cutter 218 to thereby be made into the chopped fibers, and then, they are fed to the biaxial type screw feeder 214.

[Operation of Plasticizing Unit]

An operation of the plasticizing unit 200 is outlined as follows. Please refer to FIG. 1.

When the screw 10 provided inside the heating cylinder 201 is rotated, the reinforcing fibers F fed from the fiber feed device 213 through the vent hole 206, and a pellet (the resin pellet P) comprising thermoplastic resin fed from the resin feed hopper 207 is sent out toward the discharge nozzle 203 of the downstream end of the heating cylinder 201. Note that timing to start the feed of the reinforcing fibers F is preferably set to be a timing after the resin pellet P (the molten resin M) fed from the resin feed hopper 207 reaches the vent hole 206 through which the reinforcing fibers F are fed. When the reinforcing fibers F are started to be put in before the molten resin M reaches the vent hole 206, the reinforcing fibers F poor in flowability, and conveyability by the screw 10 block the inside of the screw groove, thereby the molten resin M might be prevented from being conveyed to overflow the vent hole 206, or abnormal wear and breakage of the screw 10 might occur. After the molten resin M is mixed with the reinforcing fibers F, only a predetermined amount of the molten resin M is injected to the cavity formed between the fixed mold 103 and the movable mold 109 of the mold clamping unit 100. Note that it is needless to say that a basic operation of the screw 10 in which injection is performed by advance of the screw 10 follows after the screw 10 retreats while receiving the back pressure along with melting of the resin pellet P. In addition, the present invention does not prevent applying or being replaced with the other configuration, such as providing a heater outside the heating cylinder 201 in order to melt the resin pellet P.
[Procedure of Injection Molding]

The injection molding machine 1 including the above components performs injection molding in the following procedures.

Injection molding, as is known well, includes: a mold clamping process of closing the movable mold 109 and the fixed mold 103, and clamping them with a high pressure; a plasticizing process of heating, melting, and plasticizing the resin pellet P in the heating cylinder 201; an injection process of injecting the plasticized molten resin M to the cavity formed by the movable mold 109 and the fixed mold 103, and filling the cavity with the plasticized molten resin M; a holding process of cooling the molten resin M with which the cavity has been filled until it is solidified; a mold opening process of opening the mold; and a taking-out process of taking out a molded product cooled and solidified in the cavity. The above-mentioned respective processes are sequentially carried out, or a part of them is concurrently carried out, and the one-cycle injection molding is completed.

Subsequently, the plasticizing process and the injection process to which the embodiment is related will be explained in that order with reference to FIGS. 2A to 2C and FIGS. 3A to 3F.
[Plasticizing Process]

In the plasticizing process, the resin pellet P is fed through a feed hole 208 corresponding to the resin feed hopper 207 of the upstream side of the heating cylinder 201. The screw 10 at the time of plasticization start is located on the downstream of the heating cylinder 201, and it is retreated from an initial position while being rotated ("plasticization start" in FIG. 2A). By rotating the screw 10, the resin pellet P fed between the screw 10 and the heating cylinder 201 is gradually melted while being heated by receiving a shear force, and is conveyed toward the downstream. Note that rotation (a direction) of the screw 10 in the plasticizing process is set to be a normal rotation in the present invention. If the molten resin M is conveyed to the fiber feed device 213, the reinforcing fibers F are fed from the fiber feed device 213. Along with the rotation of the screw 10, the reinforcing fibers F are kneaded with and dispersed in the molten resin M, and are conveyed to the downstream together with the molten resin M. When feed of the resin pellet P and the reinforcing fibers F is continued, and the screw 10 is continued to be rotated, they are conveyed on the downstream side of the heating cylinder 201, and the molten resin M is accumulated closer to the downstream side than the screw 10 together with the reinforcing fibers F. The screw 10 is retreated by balance between a resin pressure of the molten resin M accumulated on the downstream of the screw 10 and the back pressure that suppresses the retreat of the screw 10. After that, the rotation and the retreat of the screw 10 are stopped at the time when an amount of the molten resin M required for one shot is accumulated ("plasticization completion" in FIG. 2B).

Figure 2A:
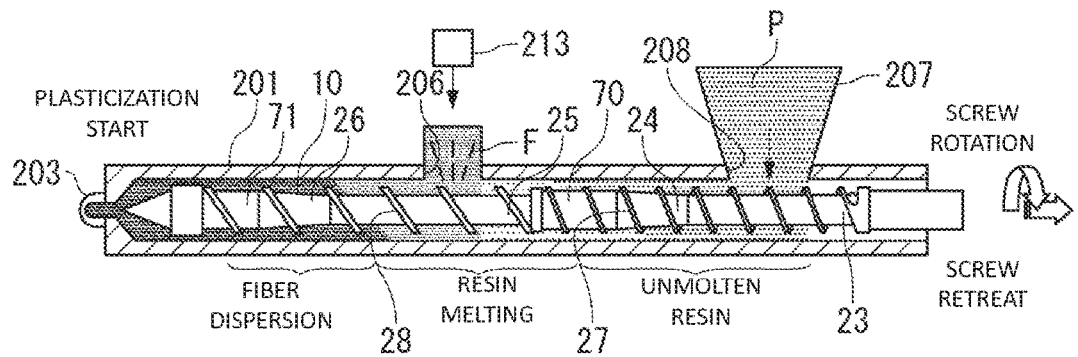
FIGS. 2A to 2C are views schematically showing molten states of resin in respective procedures of injection molding according to the embodiment.
Figure 2B:
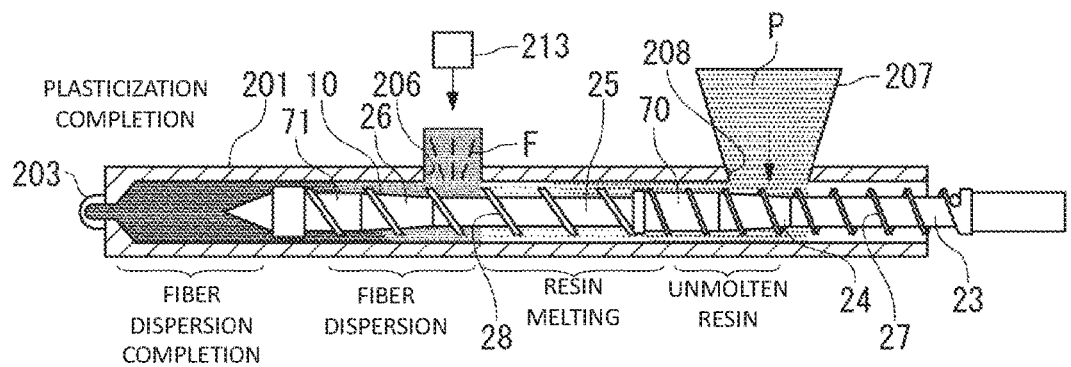
Figure 2C:
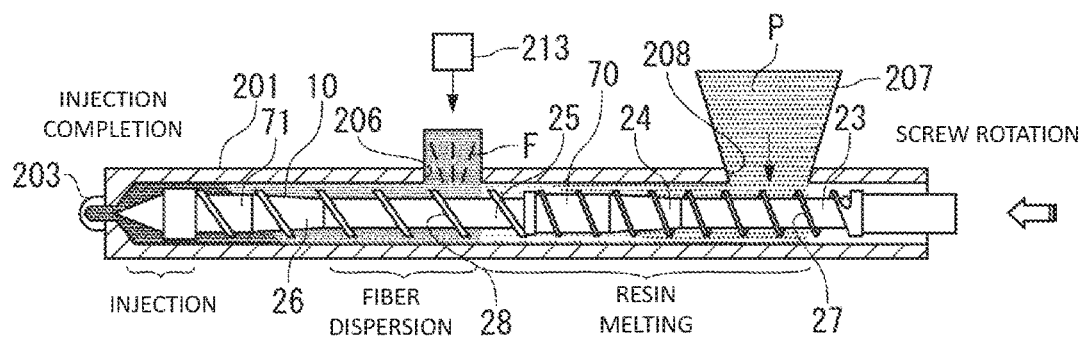

FIGS. 2A to 2C show states of the resin (the resin pellet P or the molten resin M) and the reinforcing fibers F by dividing the states into four stages of "unmolten resin", "resin melting", "fiber dispersion", and "fiber dispersion completion". In the stage of "plasticization completion", the "fiber dispersion completion" closer to the downstream than the screw 10 shows the state where the reinforcing fibers F are dispersed in the molten resin M, and are subjected to injection, and the "fiber dispersion" shows that the fed reinforcing fibers F are dispersed in the molten resin M along with the rotation of the screw 10. In addition, the "resin melting" shows that the resin pellet P is gradually melted by receiving the shear force, and the "unmolten resin" shows the state where the insufficiently melted resin remains although the shear force is received, and shows that not all the resin has been melted. However, the reinforcing fibers F may be unevenly distributed in a region of the "fiber dispersion completion" in some cases.
[Injection Process]

When the procedures enter the injection process, the screw 10 is advanced as shown in FIG. 2C. In that case, a not-shown backflow prevention valve included in a tip of the screw 10 is closed, thereby the pressure (the resin pressure) of the molten resin M accumulated on the downstream of the screw 10 rises, and the molten resin M is discharged toward the cavity from the discharge nozzle 203.

Hereafter, one-cycle injection molding is completed through the holding process, the mold opening process, and the taking-out process, and the mold clamping process and the plasticizing process of a next cycle are performed.
[Effects of Small-diameter Flight 28B]

Next, the effects of providing the small-diameter flight 28B will be explained in the embodiment.

The second stage 22 is fed with the reinforcing fibers F in the feed portion 25 thereof during the plasticizing process. As previously mentioned with reference to FIGS. 8A to 8C, it is understood that the reinforcing fibers F are present on the pull side of the flight in a form of a fiber mass in a conventional screw whose flight has a fixed diameter. The small-diameter flight 28B is provided in order to be used for opening the fiber mass and uniformly dispersing the reinforcing fibers F. Hereinafter, the embodiment will be explained with reference to FIGS. 3A to 3F. Note that hereinafter, the screw 10 is referred to as a screw 10A in order to distinguish the embodiment from a second embodiment and a third embodiment.

The screw 10A includes the large-diameter flight 28A and the small-diameter flight 28B in the second stage 22. When they are disposed inside the heating cylinder 201, as shown in FIGS. 3B and 3C, the gap (δ) is generated between the top portion T of the small-diameter flight 28B and an inside surface 2011 of the heating cylinder 201, even if the top portion T of the large-diameter flight 28A abuts against the inside surface 2011 of the heating cylinder 201.

Figure 3D:
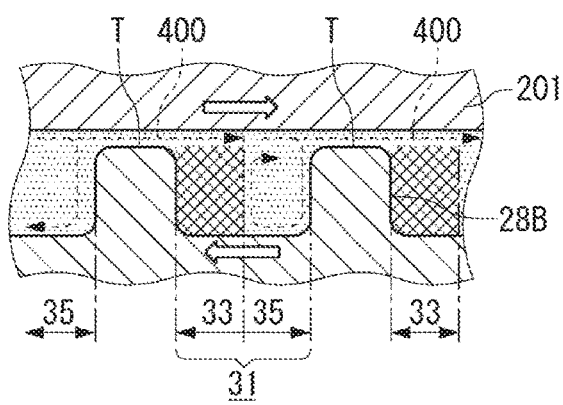

Accordingly, as shown in FIG. 3D, a part of the molten resin M staying on the push side 35 of the flight flows backward over the top portion T, and a backflow 400 is generated in the screw groove 31 of the upstream side. Since a region over the top portion T is the pull side 33 of the screw groove 31 in which the fiber mass is present, the molten resin M having flowed backward covers the reinforcing fibers F having become the fiber mass from an outside of the heating cylinder 201 in a radial direction (hereinafter referred to as an upper side). In this way, the fiber mass is brought into contact with the molten resin M also from the upper side in addition to the laterally located molten resin M of the push side 35 by providing the small-diameter flight 28B. Note that flows of the molten resin M are shown by dashed arrows in FIG. 3D.

Note that the backflow 400 of the molten resin M means that the molten resin M flows in a direction opposite (from a left side to a right side in FIG. 3D) to the molten resin M in the plasticizing process being conveyed from an upstream toward a downstream (from a right side to a left side in FIG. 3D).

Here, in order to open the fiber mass, it is important to make a shear force due to a swirling flow of the molten resin M along with the rotation of the screw 10A act not only on an outer periphery of the fiber mass but on an inside thereof.

Figure 3E:
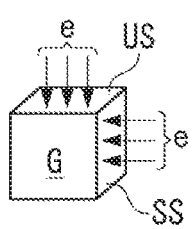
Figure 3F:
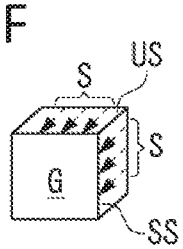

As mentioned above, by providing the small-diameter flight 28B, as shown by arrows e in FIG. 3E, the molten resin M that comes into contact with a fiber mass G (it is shown as a rectangular parallelepiped in a simplified manner) not only from a side surface SS but from an upper surface US gets into an inside of the fiber mass G, and then the fiber mass G is impregnated. Accordingly, the shear force is transmitted to a wider range inside the fiber mass G through the molten resin M as a medium compared with the fiber mass G being impregnated with the molten resin M only from the side surface SS, and as a result, opening of the fiber mass G is promoted. In addition, as shown in FIG. 3F, since a shear force S can be made to act also on the upper surface US of the fiber mass G in addition to the side surface SS thereof through the molten resin with high adherence property as a medium at the time of the rotation of the screw 10A without slipping on the inside surface 2011 of the cylinder, opening of the fiber mass G is more promoted.

In the second stage 22, a position at which the small-diameter flight 28B is provided is arbitrary as long as the molten resin M can be made to flow backward. Accordingly, although the small-diameter flight 28B can be provided at both of the feed portion 25 and the compression portion 26, it is preferably provided at the feed portion 25. In doing so, the molten resin M is conveyed to the compression portion 26 on which a stronger shear force can be made to act than on the feed portion 25 after opening of the reinforcing fibers F is promoted in the feed portion 25, thereby enabling to contribute to uniform dispersion of the reinforcing fibers F in the molten resin M. In addition, since the molten resin M can be conveyed to the compression portion 26 in which a groove depth is gradually decreased after the opening of the reinforcing fibers F is promoted to reduce a size of the fiber mass G in the feed portion 25, the large fiber mass G can be prevented from blocking an inside of the groove of the compression portion 26. In addition, the plurality of small-diameter flights 28B may be provided at a plurality of points with an interval. In this case, opening of the reinforcing fibers F can be more promoted.

The second stage 22 includes the large-diameter flight 28A.

This is for securing stable rotation of the screw 10A. That is, although all the second flights 28 of the second stage 22 can also be replaced with the small-diameter flights 28B, in that case, a gap is generated between the inside surface 2011 of the heating cylinder 201 and the top portion T of the second flight 28 in an entire region in an axial direction. In this state, when the screw 10A is rotated, the second stage 22 might be swayed, and abnormal wear and abnormal vibration of the screw 10A might occur. Consequently, in the embodiment, the large-diameter flight 28A is provided at the front and rear (the upstream side and the downstream side) of the small-diameter flight 28B, the large-diameter flight 28A is made to function as a bearing, and thereby sway of the second stage 22 is prevented to secure the stable rotation of the screw 10A. Note that the first flight 27 of the first stage 21 is used as a substitute for the large-diameter flight 28A of the upstream side of the small-diameter flight 28B, and that thereby the large-diameter flight 28A may be provided only on the downstream side of the small-diameter flight 28B.

In the embodiment, it is preferable that a lower-limit value of a size of the gap δ is set to be 0.1 mm, and that an upper-limit value thereof is set to be either smaller one of 8 mm and 60% of the groove depth. When the size of the gap δ is smaller than 0.1 mm, the reinforcing fibers F block the gap δ, which may make it difficult to generate the backflow 400. When the size of the gap δ is larger than either smaller one of 8 mm and 60% of the groove depth, an amount of the molten resin M that covers the fiber mass G is increased, impregnation of the molten resin M into the fiber mass G is promoted. However, resin conveyance capacity to the downstream side by the screw 10 might be insufficient to cause the decrease in molding production efficiency. In addition, since the size of the fiber mass G is larger on the upstream side on which the fibers have just been put in than the downstream side on which stirring has proceeded, the reinforcing fibers F easily block the gap δ when δ of the upstream side is small. Accordingly, the gap δ is preferably gradually decreased or reduced in stages from the upstream side toward the downstream side.

[Second Embodiment]

Although the screw with a single-thread flight, a so-called single-flight screw, has been explained in the first embodiment, double flight with a two-thread flight including the main flight and the sub-flight can be applied to the second stage 22. Hereinafter, a screw to which the double flight is applied will be explained as a second embodiment. The second embodiment includes a second-first mode in which the double flight is applied to a portion to which the reinforcing fibers F are fed, and a second-second mode in which the double flight is applied to a downstream region away from the portion to which the reinforcing fibers F are fed.

Note that regarding the second flight 28 in the first embodiment to be included in the main flight, hereinafter, the second flight 28 shall be read as the main flight 28, and the sub-flight is represented as a sub-flight 29. As for the other components, portions different from the first embodiment will be mainly explained hereinafter, while the same symbols as in the first embodiment are cited for the same components as in the first embodiment.

[Second-first Mode]

The screw 10B according to the second-first mode includes the main flight 28 and the sub-flight 29 as shown in FIGS. 4A, 4B, and 4C. Note that FIG. 4B shows a cross section of an arbitrary position of a downstream side, and FIG. 4C shows a cross section of an arbitrary position of an upstream side.

Although the main flight 28 is provided in a substantially entire region of the second stage 22 in an axial direction, an outer diameter specified by the top portion T of the main flight 28 is set to be equal over an entire length. The main flight 28 is independently provided without the sub-flight 29 in the compression portion 26. The outer diameter of the main flight 28 is set to be similar to that of the large-diameter flight 28A in the first embodiment. Note that the top portion of the main flight 28 is represented as a reference character $T_{28}$, and that a top portion of the sub-flight 29 as a reference character $T_{29}$.

The sub-flight 29 is provided between the main flights 28 adjacent at the front and rear, and includes the same lead as a lead of the main flight 28, or a lead larger than that of the main flight 28. As shown in FIGS. 4B and 4C, the sub-flight 29 divides the screw groove 31 provided between the adjacent main flights 28 into a pull-side groove 31A of the downstream side and a push-side groove 31B of the upstream side. The outer diameter of the sub-flight 29 is set to be smaller than that of the main flight 28, and corresponds to the small-diameter flight 28B of the first embodiment.

The sub-flight 29 is provided in a region X (FIG. 4A) of the upstream side of the second stage 22, and the region X includes a projection region of the vent hole 206 through which the reinforcing fibers F are fed to the inside of the heating cylinder 201. That is, the reinforcing fibers F which are fed are dropped or forcibly introduced in a range of the region X in which the sub-flight 29 has been formed. Particularly, at the time of start of the plasticizing process, as shown in FIG. 4A, a position of the screw 10B is set so that both sides of the screw groove 31 are bridged by the vent hole 206 with the sub-flight 29 being set as a boundary.

Next, actions and effects of the screw 10B according to the second-first mode will be explained.

The molten resin M originating from the resin pellet P fed from the resin feed hopper 207 is sent into the second stage 22 from the first stage 21. In that case, the molten resin M gets into the pull-side groove 31A between the sub-flight 29 of the screw 10B and the main flight 28 located closer to the downstream side than the sub-flight 29. As shown in FIG. 4E, a part of the molten resin M having got into the pull-side groove 31A flows backward to the push-side groove 31B over the top portion $T_{29}$ of the sub-flight 29 along with rotation of the screw 10B. The molten resin M that flows backward over the sub-flight 29 covers the reinforcing fibers F introduced into the push-side groove 31B, and an inside of the reinforcing fibers F is impregnated with the molten resin M. Note that a gap between the top portion $T_{29}$ of the sub-flight 29 and the inside surface 201I of the heating cylinder 201 in the embodiment forms the resin passage in the present invention in which the backflow of the melted resin raw material is generated.

Meanwhile, the reinforcing fibers F are fed to both of the push-side groove 31B and the pull-side groove 31A. Accordingly, the reinforcing fibers F are caught in the molten resin M having flowed backward in the push-side groove 31B, and the reinforcing fibers F are pushed into the molten resin M from an upper side in the pull-side groove 31A.

Here, although only the part of the molten resin M sent into the second stage 22 from the first stage 21 flows backward over the sub-flight 29, most of it stays on the pull-side groove 31A, and a width of the pull-side groove 31A is narrower compared with that of the screw groove of the first stage 21. Consequently, since an empty space in which the fed reinforcing fibers F can be present as the fiber mass G is significantly reduced, a degree of filling of the molten resin M in an inside of the pull-side groove 31A is high. Accordingly, since a pushing force by the fiber feed device 213 effectively acts as a force to push the reinforcing fibers F inside the molten resin M, impregnation of the molten resin M into the fiber mass G is promoted. As a result of it, the molten resin M enters the reinforcing fibers F and the reinforcing fibers F to thereby weaken tangle of the fibers, or a binder agent of the fiber bundle is melted or dissolved by heat of the molten resin M to thereby weaken a binding force, whereby opening of the reinforcing fibers F is promoted.

In addition, although a lead in a start end 29S of the sub-flight 29 coupled to the main flight 28 may have the same size as a lead of a center of the sub-flight 29 in the axial direction, it can be set as shown in FIG. 4A. That is, in the present invention, the lead in the start end 29S of the sub-flight 29 is increased more than the lead of the center of the sub-flight 29 in the axial direction, and the groove width of the pull-side groove 31A may be narrowed early. The degree of filling of the molten resin M in the inside of the pull-side groove 31A can be more enhanced by early narrowing the groove width of the pull-side groove 31A. In that case, in addition to the pushing force by the fiber feed device 213 effectively acting as the force to push the reinforcing fibers F inside the molten resin M, a pressure of the molten resin M in the pull-side groove 31A can be increased to thereby promote the backflow from the pull-side groove 31A to the push-side groove 31B.

Although the reinforcing fibers F is impregnated with the molten resin M that flows backward from the pull-side groove 31A to the push-side groove 31B, a proper shear force acts when the molten resin M flows backward passing through the gap between the top portion $T_{29}$ of the sub-flight 29 and the inside surface of the heating cylinder 201, and thus opening of the fiber mass G that flows backward from the pull-side groove 31A to the push-side groove 31B together with the molten resin M can be more promoted.

The molten resin M reaches an end point of the sub-flight 29 while impregnation of the molten resin M into the fiber mass G in the pull-side groove 31A and an action of the strong shear force at the time of the backflow of the molten resin M are continued along with the rotation of the screw 10B. In the process, as shown in FIG. 4D, the width of the pull-side groove 31A becomes narrower, and the opened reinforcing fibers F are dispersed in the molten resin M that has flowed backward from the pull-side groove 31A to the push-side groove 31B whose width has become wider.

In the embodiment, both of the start end 29S and a terminal end 29E of the sub-flight 29 are blocked to the main flight 28, which is not essential in the embodiment. However, while the molten resin M leaks from gaps of the start end 29S and the terminal end 29E when the start end 29S and the terminal end 29E are separated from the main flight 28, the molten resin M can flow backward over all the top portions $T_{29}$ of the sub-flights 29 to give the shear force if the gaps are blocked.

[Second-second Mode]

Figure 5A:
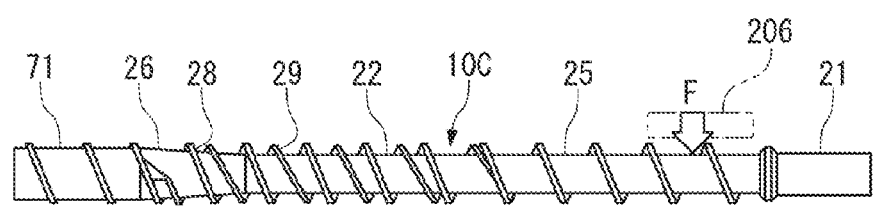
FIGS. 5A to 5E show a still other screw (a second-second mode) according to the embodiment.
Figure 5B:
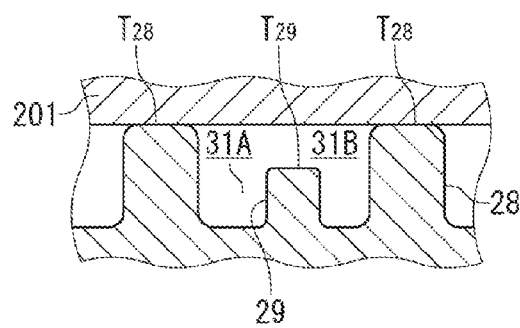
Figure 5C:
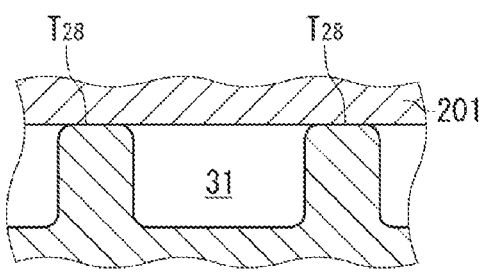

In a screw 10C according to the second-second mode, the sub-flight 29 is provided closer to the downstream than a put-in portion for the reinforcing fibers F as shown in FIGS. 5A, 5B, and 5C. Since except for the point, the screw 10C has the same configuration as the screw 10B of the second-first mode, differences from the screw 10B will be mainly explained hereinafter.

Figure 5D:
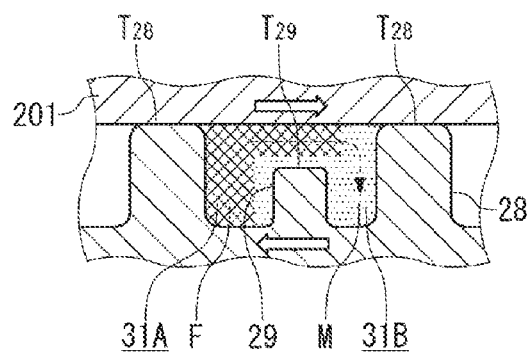
Figure 5E:
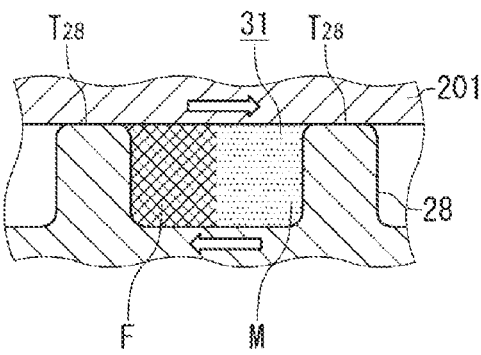

In the screw 10C, while the sub-flight 29 is provided substantially from a center portion toward a downstream end of the feed portion 25, the main flight 28 is independently provided closer to the upstream side than a region in which the sub-flight 29 is provided. Accordingly, similarly to the case shown in the first embodiment, as shown in FIG. 5E, the molten resin M and the reinforcing fibers F are divided into the push-side groove 31B and the pull-side groove 31A until the reinforcing fibers F are fed and reach the sub-flight 29.

Along with rotation of the screw 10C, the molten resin M and the reinforcing fibers F are conveyed downstream, and reach a double-flight zone in which the sub-flight 29 is provided. In that case, the molten resin M is guided to the pull-side groove 31A together with the reinforcing fibers F. When the molten resin M and the reinforcing fibers F are further conveyed to the downstream side, the molten resin M, as shown in FIG. 5D, flows backward to the push-side groove 31B over the top portion $T_{29}$ of the sub-flight 29 together with the reinforcing fibers F as the width of the pull-side groove 31A becomes gradually narrower. Since a strong shear force acts when the molten resin M passes through the gap between the top portion $T_{29}$ of the sub-flight 29 and the inside surface 2011 of the heating cylinder 201, opening of the reinforcing fibers F transferred to the push-side groove 31B is promoted. However, it is also assumed that the fiber mass G with insufficient opening remains even though the molten resin M flows backward over the top portion $T_{29}$ of the sub-flight 29. However, with respect to the fiber mass G unevenly distributed on a pull-side side surface of the sub-flight 29, similarly to the second-first mode, the backflow of the molten resin M together with the reinforcing fibers F from the pull-side groove 31A to the push-side groove 31B is continued to the terminal end of the sub-flight 29. As a result of the above, the molten resin M that has flowed backward over the top portion $T_{29}$ of the sub-flight 29 covers the fiber mass G unevenly distributed on the pull-side side surface of the sub-flight 29, whereby impregnation of the molten resin M is promoted into the fiber mass G, opening of the reinforcing fibers F in the molten resin M in the push-side groove 31B are more promoted, and they are uniformly dispersed.

Figure 6A:
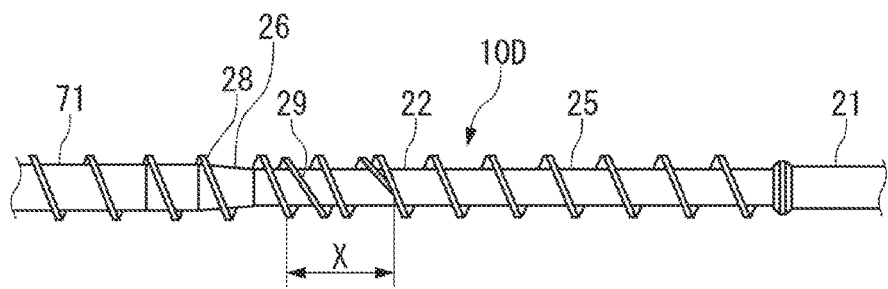
FIGS. 6A and 6B are views showing a modified example of the screw according to FIGS. 5A to 5E.

Although widening of each of the push-side groove 31B and the pull-side groove 31A is gradual since the screw 10C has a long range in which the sub-flight 29 is provided, the range in which the sub-flight 29 is provided can also be made shorter to make the widening sharp as shown in FIG. 6A. In this case, a shear force per unit time acting on the fiber mass G when the molten resin M flows backward over the sub-flight 29 can be strengthened.

Figure 6B:
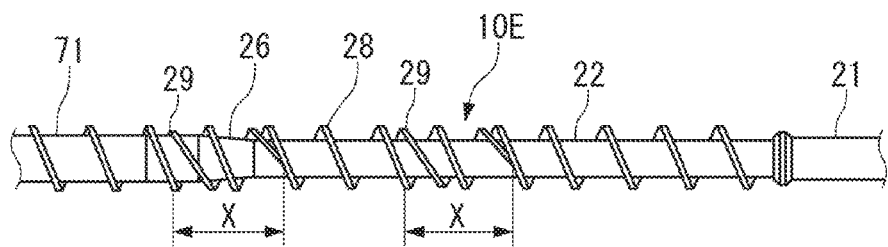

The short sub-flight 29 is provided at a plurality of points (two points here) with an interval as shown in FIG. 6B, and thereby opening of the reinforcing fibers F can be more promoted.

In addition, in a case of providing the sub-flight 29 at the plurality of points, a combination of the flights to be combined is arbitrary. For example, the sub-flights 29 each having a region X with the same length may be combined with each other as shown in FIG. 6B, or the sub-flights 29 each having the region X with a different length may be combined with each other. In a former case, the sub-flights 29 each having the long region X as shown in FIG. 4A or 5A may be combined with each other. In addition, in a latter case, the sub-flight 29 with the long region X as shown in FIG. 4A or 5A, and the sub-flight 29 with the short region X as shown in FIG. 6A may be combined with each other.

In addition, the gap δ, which is a difference in height between the main flight 28 and the sub-flight 29 in the second-first mode and the second-second mode, is preferably set to be similar to an example 1. That is, it is preferable that the lower-limit value of the gap δ is set to be 0.1 mm, and that the upper-limit value thereof is set to be either smaller one of 8 mm and 60% of the groove depth. Additionally, it is preferable that the gap δ is reduced in stages from the upstream side toward the downstream side, or is gradually decreased over an entire length or in a part of the region X. Particularly, in a case of including the sub-flight 29 in the plurality of points, the gap δ in the sub-flight 29 in each point may be gradually decreased from the downstream side to the upstream side, or the gap δ between the sub-flights 29 provided on the downstream side may be relatively reduced to the gap δ between the sub-flights 29 provided on the upstream side with the gap δ in the sub-flight 29 in each point being set to be constant, respectively. In this case, an appropriate shear force can be added to the fiber mass G in which stirring has proceeded by reducing δ of the downstream side similarly to the case shown in the first embodiment, which is effective for opening the fiber mass G. Particularly by setting the gap δ on the upstream side to be large, there can be prevented breakage of the reinforcing fibers F due to generation of an excessive shear force caused by the large fiber mass G being rapidly deformed when the large fiber mass G enters the gap δ between the top portions $T_{29}$ of the sub-flights 29, opening of the large fiber mass G not having proceeded.

In addition, the length of the region X of the sub-flight 29 is preferably set to be 1.5×D to 12×D (D is an inner diameter of the heating cylinder 201).

When the region X is shorter than 1.5×D, breakage of the reinforcing fibers F easily occurs due to an excessive compressive force and shear force generated by rapid deformation of the fiber mass G due to rapid reduction of a groove cross section area of the pull-side groove 31A. In addition, the large fiber mass G must flow into the small gap δ in a short distance, and thus the gap δ might be blocked by the fiber mass G. In that case, the backflow of the molten resin M from the downstream side to the upstream side is not generated.

When the region X is longer than 12×D, a region in which the molten resin M covers the fiber mass G becomes large, and thus impregnation of the molten resin M into the fiber mass G is promoted. However, most of the molten resin M flows backward over the sub-flight 29 by the time when the molten resin M reaches the terminal end 29E of the sub-flight 29. In that case, only the fiber mass G with poor flowability and conveyability by the screw 10 remains near the terminal end 29E, and the fiber mass G cannot flow backward over the sub-flight 29, and might stay in the pull-side groove 31A.

In addition, the groove depth of the pull-side groove 31A may be constant (the feed portion 25 or the measurement portion 71) over the entire length of the region X. However, the present invention is not limited to this, and the groove depth of the pull-side groove 31A is preferably gradually decreased from the upstream side toward the downstream side with the vicinity of the terminal end 29E of the sub-flight 29 being set as the compression portion 26, in order to prevent the molten resin M or the fiber mass G from staying at the terminal end 29E of the sub-flight 29. As for a switching position from the feed portion 25 to the compression portion 26, the feed portion 25 may be switched to the compression portion 26 on the position closer to the upstream side than the region X, or may be switched inside the region X. Particularly, in the terminal end 29E of the sub-flight 29, the groove depth is preferably gradually decreased from a groove bottom of the pull-side groove 31A to the top portion $T_{29}$ of the sub-flight 29 so that the pull-side groove 31A disappears. In this case, an inclination at which the groove depth of the pull-side groove 31A is gradually decreased in the terminal end 29E may be the same as an inclination of the compression portion 26, or may be set to be larger or smaller than the inclination of the compression portion 26 by switching the inclination near the terminal end 29E.

[Third Embodiment]

Although in the first embodiment and the second embodiment, examples have been explained where the resin passage in which the backflow of the melted resin raw material is generated is continuously provided in the predetermined range in the winding direction of the flight, the resin passage can be provided at a part of the winding direction of the flight in the present invention. Hereinafter, a screw in which the resin passage is applied to the part of the winding direction of the flight will be explained as a third embodiment.

Note that hereinafter, portions different from the first embodiment will be mainly explained, while citing the same symbols as in the first embodiment for the same components as in the first embodiment.

In a screw 10F according to the third embodiment, as shown in FIG. 7A, a notch 75 is provided in a part of the second flight 28, and a flight 28C of the upstream side and a flight 28D of the downstream side that are divided by the notch 75 are included in the intermittent second flight 28. In the second flight 28, the part of the second flight 28 continuous in the winding direction is notched to make a terminal end of the flight 28C of the upstream side, and a screw groove of the upstream side and a screw groove of the downstream side are coupled with each other in a groove bottom with the notch 75 being set as a boundary. The gap (δ) is provided between a terminal end of the flight 28C of the upstream side and a start end of the flight 28D of the downstream side, and the gap (δ) corresponds to a resin passage in the present invention in which a backflow is generated in the molten resin M.

Next, actions and effects of the screw 10F according to the third embodiment will be explained.

In the screw 10F, the intermittent flight in which the gap (δ) has been provided is included by providing the notch 75 in the part of the second flight 28 of the second stage, and the screw groove of the upstream side and the screw groove of the downstream side are coupled with each other in the groove bottom.

Accordingly, as shown in FIG. 7A, a part of the molten resin M staying on the push side 35 of the flight passes through the notch 75 that forms the gap (δ) between the terminal end 28E of the upstream-side flight 28C and the start end 28S of the downstream-side flight 28D, and flows backward to the screw groove 31 of the upstream side. Since a region located through the gap (δ) is the pull side 33 of the screw groove 31 in which the fiber mass G is present, the molten resin M having flowed backward covers the reinforcing fibers F having become the fiber mass G mainly from a side from the pull side 33. In this way, the fiber mass G is brought into contact with the molten resin M also from the pull side 33 in addition to the laterally located molten resin M of the push side 35 by providing the notch 75. Note that a flow of the molten resin M is shown by a dashed arrow in FIG. 7A.

A position at which the notch 75 of the flight is provided, a size, and the number of the notch 75 of the flight in the second stage 22 are arbitrary as long as the molten resin M can be made to flow backward.

In addition, the number of threads of the second flight 28 having the notch 75 is not limited to one, and the plural threads of the second flights 28 and 28 each having a different phase in a peripheral direction may be provided as shown in FIG. 7B. In a case of the plural threads of the second flights 28 and 28, only a part of the respective second flights 28 and 28 may be overlapped, or all of them may be overlapped. In this case, since the notch 75 is provided in the respective second flights 28 and 28, the plurality of gaps δ are formed.

Figure 8C:
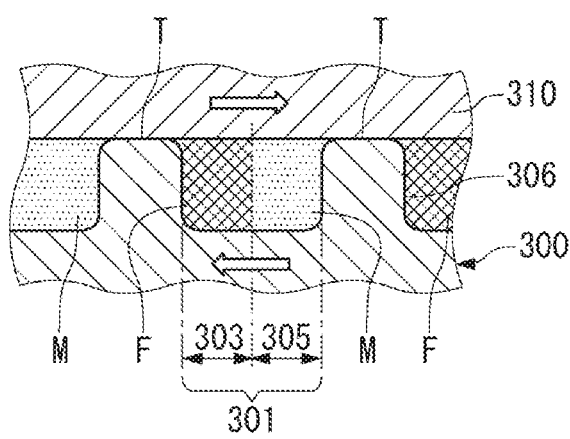

In addition, as shown in FIG. 8C, as for the number of flight threads, the number of flight threads of the upstream side is preferably more reduced than that of the downstream side so that opening of the reinforcing fibers F is promoted, the fiber mass G is sequentially subdivided into smaller ones, surfaces of the smaller fiber masses G are covered with the resin, the smaller fiber masses G are impregnated with the resin, and so that the resin containing the smaller fiber masses G can be conveyed to the compression portion 26 in which a groove depth is gradually decreased. FIG. 8C shows an example where a two-thread flight is employed on the upstream side, and where a three-thread flight on the downstream side.

In addition, in a case of providing the plurality of gaps δ, all the gaps δ may have the same width, but they can have different widths. Since the size of the fiber mass G is larger on the upstream side on which the fibers have just been put in than the downstream side on which stirring has proceeded, the reinforcing fibers F easily block the gap δ when δ of the upstream side is small. Consequently, the gap δ is preferably gradually decreased or reduced in stages from the upstream side toward the downstream side. In addition, since the molten resin M can be conveyed to the compression portion 26 in which the groove depth is gradually decreased after the opening of the reinforcing fibers F is promoted to reduce a size of the fiber mass G in the feed portion 25, the large fiber mass G can be prevented from blocking the inside of the groove of the compression portion 26.

In addition, in the intermittent second flight 28, the flight 28D of the downstream side may be provided with a phase thereof being displaced to an extension in the winding direction of the flight 28C of the upstream side as shown in FIG. 7D. In this case, since a contact area of the fiber mass G with the molten resin M flowing backward in the terminal end of the flight is increased, impregnation of the molten resin M into the fiber mass G is promoted.

Hereinbefore, although the present invention has been explained based on the embodiment, it is possible to select a configuration exemplified in the above-described embodiment or to appropriately change the configuration to the other configuration, unless the configuration departs from the spirit of the present invention, In addition, the small-diameter flight 28B of the first mode and the sub-flight 29 of the second mode may be combined and provided with an interval, or the sub-flight 29 may be provided in the screw groove 31 of the small-diameter flight 28B. In addition, the flights of the first to third embodiments may be arbitrarily combined and provided.

In addition, the screw 10 is not limited to a two-stage type design shown in the embodiment, and it can be a three-stage type design further including a third stage on a downstream side of the second stage, the third stage including a feed portion, a compression portion, and a measurement portion. In this case, such a function that adds a function member to the molten resin or deairs a volatile substance may be added to the third stage.

In the plasticizing unit 200 of the present invention, although the fiber feed device 213 and the resin feed hopper 207 are fixed to the heating cylinder 201, a movable hopper that moves in the axial direction of the screw 10 can be employed. Particularly in a case where a multiaxial type measurement feeder is used for the fiber feed device 213, a plurality of feeders may be parallelly coupled and arranged in the longitudinal direction of the screw 10, and the feeders that feed the reinforcing fibers F in the plasticizing process may be switched and used. Specifically, the reinforcing fibers F are fed from the feeder arranged at the tip side of the screw 10 at the time of start of the plasticizing process, and along with the retreat of the screw 10 in the plasticizing process, the feeder that feeds the reinforcing fibers F may be switched to the feeders of the back side one after the other so that a relative position of the screw 10 and a feeder screw from which the fibers are discharged is not changed. Hereby, a feed position of the reinforcing fibers F to the screw 10 can be set to be constant regardless of the change of the relative position of the heating cylinder 201 and the screw 10 due to the retreat of the screw 10 and the advance of the screw 10 at the time of injection.

Specifically, since a position of the fiber feed feeder screw at the time of plasticization completion, i.e. a position of the backmost screw groove filled with the reinforcing fibers F, can be made coincide with a position of the fiber feed feeder screw at the time of next plasticization start in a position of the screw advanced by the injection, the reinforcing fibers F can be continuously fed to the screw groove located closer to the downstream than the fiber feed device 213, and it is effective for preventing or suppressing generation of a region not filled with the reinforcing fibers F, the region being located in the groove of the screw 10 closer to the downstream than the fiber feed device 213.

In addition, as a way of switching the feeder screws, mere ON/OFF control may be performed, or the number of rotation of adjacent screw feeders may be changed in cooperation. Specifically, the number of rotation of the screw feeders of the downstream side is gradually reduced along with the retreat of the screw, and the number of rotation of the screw feeders of the back side may be increased gradually.

In addition, feed of the reinforcing fibers F to the heating cylinder 201 may be performed not only in the injection process and the plasticizing process, but may also be, for example, performed in a dwelling process and an injection standby process (a period from completion of the plasticizing process to start of the injection process). Since the screw 10 does not perform rotation, and advance or retreat during the dwelling process and the injection standby process, the vent hole is not intermittently blocked by movement of the flights. For this reason, the reinforcing fibers can be stably fed in the groove of the screw 10.

In addition, not only the reinforcing fibers F but the reinforcing fibers F with which powdery or pellet-type raw resin has been mixed may be fed to the fiber feed device 213. In this case, even though the molten resin M cannot easily infiltrate between the reinforcing fibers F, the mixed raw resin is melted in the mass of the reinforcing fibers F, enters the inside of the fiber bundle, and can promote loosening of the fiber bundle.

In addition, resin and reinforcing fibers applied to the present invention are not particularly limited, and well-known materials are widely encompassed, such as: general-purpose resin, such as polypropylene and polyethylene; well-known resin such as engineering plastics, such as polyamide and polycarbonate; and well-known reinforcing fibers, such as glass fibers, carbon fibers, bamboo fibers, and hemp fibers. Note that in order to remarkably obtain the effects of the present invention, fiber reinforced resin with a high content rate of reinforcing fibers, i.e. a content rate not less than 10%, is preferably employed as a target. However, since conveyance resistance of the reinforcing fibers in the screw groove becomes large when the content rate of the reinforcing fibers exceeds 70%, it becomes difficult to convey the reinforcing fibers in the present invention using the small-diameter flights with relatively low conveyance capacity of resin, and the reinforcing fibers might block the inside of the screw groove to generate vent-up in the vent hole portion. For this reason, the content rate of the reinforcing fibers applied to the present invention is preferably 10 to 70%, and is more preferably 15 to 50%.

REFERENCE SIGNS LIST 1 injection molding machine
10, and 10B to 10G screw
21 first stage
22 second stage
23 feed portion
24 compression portion
25 feed portion
26 compression portion
27 first flight
28 second flight, main flight
28A large-diameter flight
28B small-diameter flight
28C flight
28D flight
28E terminal end
28S start end
29 sub-flight
29E terminal end
29S start end
31 screw groove
31A pull-side groove
31B push-side groove
33 pull side
35 push side
50 control unit
70 measurement portion
71 measurement portion
75 notch
100 mold clamping unit
101 base frame
103 fixed mold
105 fixed die plate
107 slide member
109 movable mold
111 movable die plate
113 hydraulic cylinder
115 tie bar
117 hydraulic cylinder
119 ram
121 male screw portion
123 half nut
200 plasticizing unit
201 heating cylinder
2011 inside surface
203 discharge nozzle
206 vent hole
207 resin feed hopper
208 feed hole
209 first electric motor
211 second electric motor
213 fiber feed device
214 biaxial type screw feeder
215 pellet feed device
218 roving cutter
300 screw
301 screw groove
303 pull side
305 push side
306 flight
310 cylinder
400 backflow
F reinforcing fibers
G fiber mass
M molten resin
P resin pellet
T, $T_{28}$, and $T_{29}$ top portion
δ gap

The invention claimed is:

1. An injection molding machine to which a resin raw material is fed on an upstream side and to which reinforcing fibers are fed on a downstream side, the injection molding machine comprising:
   a cylinder at which a discharge nozzle has been formed;
   a screw provided rotatable and movable in a rotation axis direction inside the cylinder;
   a resin feed portion that feeds the resin raw material in the cylinder; and
   a fiber feed portion that is provided closer to a downstream side than the resin feed portion, and feeds the reinforcing fibers in the cylinder, wherein
   the screw comprises:
   a first stage at which the resin raw material which is fed is melted; and
   a second stage that continues to the first stage and comprises a feed portion and a compression portion closer to the downstream side than the feed portion of the second stage, and at which the melted resin raw material and the fed reinforcing fibers are mixed with each other, wherein
   a flight provided at the feed portion of the second stage includes:
   a large-diameter flight with a relatively large outer diameter, and a small-diameter flight with a relatively small outer diameter; and
   a resin passage formed with a gap between a top portion of the small-diameter flight and the cylinder and in which a backflow of the melted resin raw material is generated from a screw groove of the downstream side toward a screw groove of the upstream side of the screw.

2. The injection molding machine according to claim 1, wherein in the feed portion of the second stage, the flight is formed with a two-thread flight including a main flight, and a sub-flight provided in a screw groove formed by the main flight, and
   the main flight serves as the large-diameter flight, and the sub-flight serves as the small-diameter flight.

3. The injection molding machine according to claim 2, wherein the sub-flight is provided at a part or a plurality of parts of the screw in an axial direction.

4. The injection molding machine according to claim 2, wherein the sub-flight is provided corresponding to a portion to which the reinforcing fibers are fed.

5. The injection molding machine according to claim 2, wherein either one or both of a start end and a terminal end of the sub-flight is/are blocked to the main flight.

6. A method comprising:
   feeding a resin raw material to a cylinder of an injection molding machine at which a discharge nozzle has been formed, and inside which a screw rotatable and movable in a rotation axis direction inside the cylinder has been provided;
   feeding reinforcing fibers closer to a downstream side than the resin raw material; and
   injection-molding the reinforcing fibers,
   wherein the injection molding machine comprises:
   a resin feed portion that feeds the resin raw material in the cylinder; and
   a fiber feed portion that is provided closer to the downstream side than the resin feed portion, and feeds the reinforcing fibers in the cylinder, wherein
   the screw comprises:
   a first stage at which the resin raw material which is fed is melted; and
   a second stage that continues to the first stage and comprises a feed portion and a compression portion closer to the downstream side than the feed portion of the second stage, and at which the melted resin raw material and the fed reinforcing fibers are mixed with each other,
   wherein
   a flight provided at the feed portion of the second stage includes:
   a large-diameter flight with a relatively large outer diameter, and a small-diameter flight with a relatively small outer diameter; and
   a resin passage formed with a gap between a top portion of the small-diameter flight and the cylinder and in which a backflow of the melted resin raw material is generated from a screw groove of the downstream side toward a screw groove of the upstream side of the screw.

* * * * *